(12) United States Patent
Hanawa et al.

(10) Patent No.: US 9,488,243 B2
(45) Date of Patent: Nov. 8, 2016

(54) DAMPER WITH A VEHICLE HEIGHT ADJUSTING FUNCTION

(75) Inventors: Nobumichi Hanawa, Kani (JP);
Tsutomu Yoshimoto, Minokamo (JP)

(73) Assignee: KYB Corporation, Tokyo (JP)

( * ) Notice: Subject to any disclaimer, the term of this patent is extended or adjusted under 35 U.S.C. 154(b) by 86 days.

(21) Appl. No.: 14/130,398

(22) PCT Filed: Jul. 19, 2012

(86) PCT No.: PCT/JP2012/068319
§ 371 (c)(1),
(2), (4) Date: Dec. 31, 2013

(87) PCT Pub. No.: WO2013/021798
PCT Pub. Date: Feb. 14, 2013

(65) Prior Publication Data
US 2014/0124311 A1    May 8, 2014

(30) Foreign Application Priority Data
Aug. 8, 2011 (JP) ................................. 2011-172495

(51) Int. Cl.
*F16F 9/46* (2006.01)
*F16F 9/50* (2006.01)
*B60G 15/06* (2006.01)
*B60G 17/017* (2006.01)
*F16F 9/56* (2006.01)

(52) U.S. Cl.
CPC .............. *F16F 9/46* (2013.01); *B60G 15/062* (2013.01); *B60G 17/017* (2013.01); *F16F 9/50* (2013.01); *F16F 9/56* (2013.01); *B60G 2500/30* (2013.01)

(58) Field of Classification Search
CPC .............. B60G 15/062; B60G 17/017; B60G 2500/30; F16F 9/46; F16F 9/50; F16F 9/56
USPC ............................................... 188/266, 282.9
See application file for complete search history.

(56) References Cited

U.S. PATENT DOCUMENTS

| 4,364,582 A | * | 12/1982 | Takahashi et al. | ..... 280/124.155 |
| 4,720,085 A | * | 1/1988 | Shinbori et al. | ........... 267/64.16 |
| 5,009,451 A | * | 4/1991 | Hayashi et al. | ........... 280/6.157 |
| 5,181,696 A | * | 1/1993 | Abe | ........................... 267/64.17 |

(Continued)

FOREIGN PATENT DOCUMENTS

| JP | S63-79208 U | 5/1988 |
| JP | H03-99923 A | 4/1991 |

(Continued)

*Primary Examiner* — Melanie Torres Williams
(74) *Attorney, Agent, or Firm* — Rabin & Berdo, P.C.

(57) ABSTRACT

A damper with a vehicle height adjusting function includes a damper body and a vehicle height adjusting mechanism adapted to adjust an axial length of the damper body. The damper body includes a cylinder, a head member having an annular shape and closing one end of the cylinder, a piston rod axially supported on an inner periphery of the head member and inserted in the cylinder so as to be movable in an axial direction, and a piston retained by the piston rod and partitioning an inside of the cylinder into two pressure chambers. The vehicle height adjusting mechanism includes a partition wall member defining a jack chamber in one of the pressure chambers and being capable of extending and contracting in the axial direction, and a pump supplying/discharging a working fluid into/from the jack chamber.

7 Claims, 3 Drawing Sheets

(56) References Cited

U.S. PATENT DOCUMENTS

| | | | | |
|---|---|---|---|---|
| 5,927,071 | A * | 7/1999 | Asanuma et al. | 60/396 |
| 6,170,621 | B1 * | 1/2001 | Nakahara et al. | 188/274 |
| 6,179,098 | B1 * | 1/2001 | Hayakawa et al. | 188/274 |
| 6,247,683 | B1 * | 6/2001 | Hayakawa et al. | 267/64.11 |
| 8,844,944 | B1 * | 9/2014 | Murakami | 280/5.514 |
| 2007/0029711 | A1 * | 2/2007 | Ehara et al. | 267/64.28 |

FOREIGN PATENT DOCUMENTS

| | | |
|---|---|---|
| JP | H09-263283 A | 10/1997 |
| JP | 2004-262392 A | 9/2004 |
| JP | 2004-359180 A | 12/2004 |
| JP | 2005-14887 A * | 1/2005 |
| JP | 2005-121038 * | 5/2005 |
| JP | 2006-170258 A | 6/2006 |

* cited by examiner

DAMPER WITH A VEHICLE HEIGHT ADJUSTING FUNCTION

TECHNICAL FIELD

The present invention relates to an improvement of a damper with a vehicle height adjusting function.

BACKGROUND ART

A damper with a vehicle height adjusting function, which includes a damper body and a vehicle height adjusting mechanism for adjusting an axial length of the damper body, is applied, for example, to a suspension device for suspending a rear wheel of a motorcycle.

JP 09-263283 A discloses a damper with a vehicle height adjusting function including a damper body for damping road surface vibration that is input to a wheel, and a vehicle height adjusting mechanism for adjusting an axial length of the damper body.

The damper body is fixed through the intermediation of a wheel-side bracket to a link mechanism provided between a frame and a swing arm for supporting a rear wheel. The vehicle height adjusting mechanism includes: a pair of elliptical holes formed in an inverted U-shaped forked tip of the wheel-side bracket; and a pair of inverted collars fitted into the elliptical holes, respectively.

A through-hole is eccentrically formed in one of the inverted collars, whereas an internal thread is eccentrically formed in another one of the inverted collars. The link mechanism is arranged in the forked tip of the wheel-side bracket. A bolt is inserted through the through-hole of the one of the inverted collars toward the internal thread of the another one of the inverted collars, and thus the damper body is coupled to the rear wheel. Accordingly, a vehicle height can be adjusted by changing a mounting direction of both the inverted collars.

Further, JP 2006-170258 A discloses a damper with a vehicle height adjusting function, which is interposed between a vehicle body and a wheel of an automobile or the like. The damper with a vehicle height adjusting function includes a damper body, a vehicle height adjusting mechanism, and a suspension spring arranged on an outer side of the damper body.

The vehicle height adjusting mechanism includes a plurality of cam grooves formed at different depth levels in a lower end surface of a tubular lower spring bearing that is fixed to an outer periphery of the damper body so as to support a lower end of the suspension spring, and a cam portion that extends from an axle-side bracket for coupling the damper body to a wheel and selectively engages with any one of the cam grooves.

The damper with a vehicle height adjusting function can change a position of the lower spring bearing depending on the cam grooves with which the cam portion engages. In this manner, the axial length of the damper body is adjusted, and thus a vehicle height can be adjusted.

SUMMARY OF INVENTION

However, in the above-mentioned conventional damper with a vehicle height adjusting function, the vehicle height can be adjusted only in a state in which the vehicle stops, and hence the vehicle height cannot be adjusted both during running and at the time of stop of the vehicle.

Therefore, for example, in a case where the damper is applied to a suspension device for suspending a rear wheel of a motorcycle, when the vehicle height is set low in order for a rider to easily put his/her feet on the ground at the time of stop of the vehicle, the appropriate vehicle height cannot be ensured during running of the vehicle. On the other hand, when the vehicle height is set to a height that is appropriate during running of the vehicle, easiness for a rider to put his/her feet on the ground at the time of stop of the vehicle is reduced.

It is an object of the present invention to provide a damper with a vehicle height adjusting function, which is capable of adjusting a vehicle height both during running and at the time of stop of the vehicle.

According to one aspect of the present invention, a damper with a vehicle height adjusting function being capable of adjusting a vehicle height comprises a damper body including a cylinder, a head member having an annular shape and closing one end of the cylinder, a piston rod axially supported on an inner periphery of the head member and inserted in the cylinder so as to be movable in an axial direction, and a piston retained by the piston rod and partitioning an inside of the cylinder into two pressure chambers, and a vehicle height adjusting mechanism adapted to adjust an axial length of the damper body, wherein the vehicle height adjusting mechanism includes a partition wall member defining a jack chamber in one of the pressure chambers and being capable of extending and contracting in the axial direction, and a pump supplying/discharging a working fluid into/from the jack chamber.

Embodiments of the present invention and advantages thereof are described in detail below with reference to the accompanying drawings.

DESCRIPTION OF EMBODIMENTS

In the following, a damper with a vehicle height adjusting function according to an embodiment of the present invention is described with reference to the drawings. The same reference symbols of the respective drawings denote the same or corresponding components.

Figure 1:
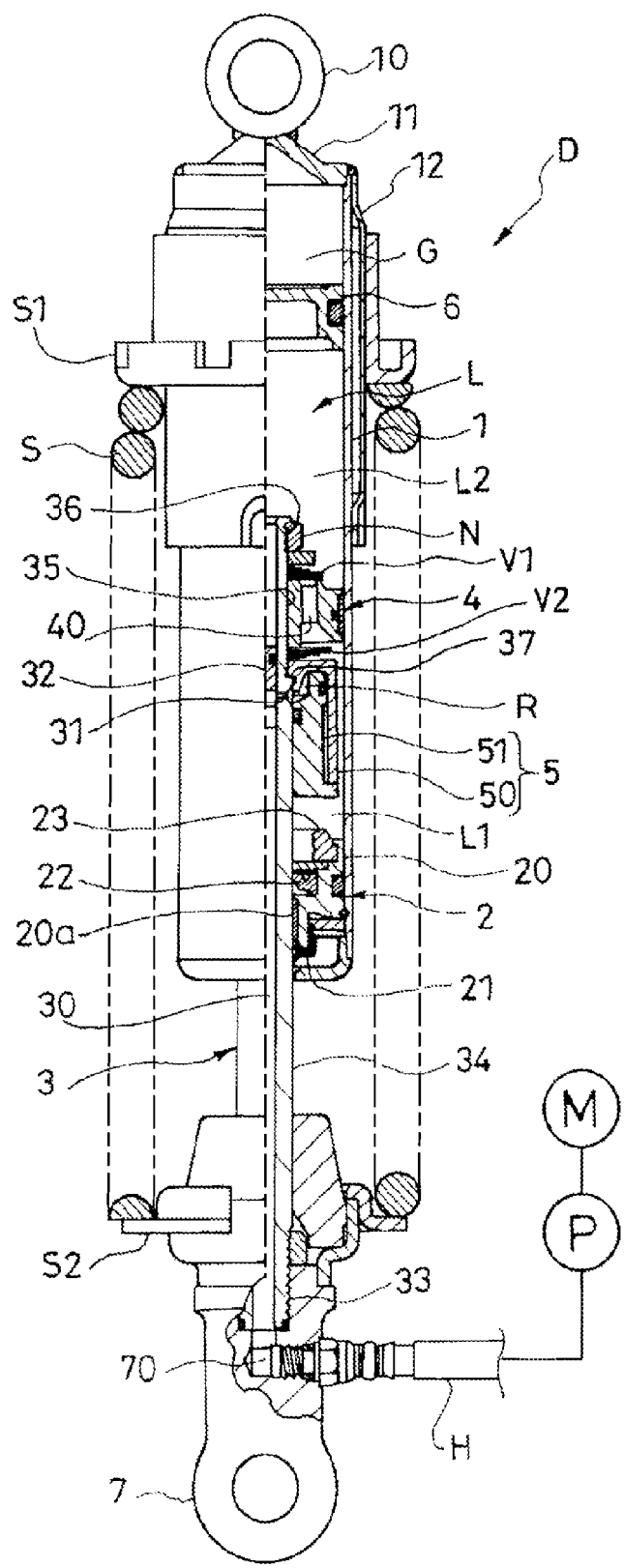
FIG. 1 is a partially cutout side view illustrating a damper with a vehicle height adjusting function according to an embodiment of the present invention.

As illustrated in FIG. 1, a damper D with a vehicle height adjusting function according to this embodiment includes a damper body and a vehicle height adjusting mechanism. The damper body includes a cylinder 1, a head member 2 having an annular shape and closing one end of the cylinder 1, a piston rod 3 axially supported on an inner periphery of the head member 2 and inserted in the cylinder 1 so as to be movable in an axial direction, and a piston 4 retained by the piston rod 3 and partitioning an inside of the cylinder 1 into two pressure chambers L1, L2. The vehicle height adjusting mechanism adjusts an axial length of the damper body.

The vehicle height adjusting mechanism includes a partition wall member 5, which defines a jack chamber R in one of the pressure chambers (extension-side pressure chamber L1) and is capable of extending and contracting in the axial direction, and a pump P for supplying/discharging a working fluid into/from the jack chamber R.

The damper D with a vehicle height adjusting function is applied to, for example, a suspension device for suspending a rear wheel of a motorcycle, and includes the damper body, the vehicle height adjusting mechanism, and a suspension spring S arranged on an outer side of the damper body.

The suspension spring S is a coil spring, and is interposed between an upper spring bearing S1 fixed to an upper portion of an outer periphery of the cylinder 1 illustrated in FIG. 1, and a lower spring bearing S2 fixed to a lower portion of an outer periphery of the piston rod 3 illustrated in FIG. 1. The suspension spring S always biases the damper body in an extending direction, and absorbs a shock caused due to roughness of a road surface.

The damper body, which is arranged inside the suspension spring S, is such an inverted type in which the cylinder 1 is coupled to a vehicle body through the intermediation of a vehicle-body-side bracket 10 and the piston rod 3 is coupled to the rear wheel through the intermediation of a wheel-side bracket 7.

The cylinder 1 is formed into a cylindrical shape, and a bottom member 11 is welded and fixed to an upper end of the cylinder 1 illustrated in FIG. 1. The bottom member 11 closes an upper opening of the cylinder 1 illustrated in FIG. 1.

On the other hand, the head member 2 is fixed to a lower end portion of an inner periphery of the cylinder 1 illustrated in FIG. 1. The head member 2 closes a lower opening of the cylinder 1 illustrated in FIG. 1.

In an inside of the cylinder 1 formed between the bottom member 11 and the head member 2, a working fluid chamber L and a gas chamber G are formed. The working fluid chamber L is filled with the working fluid. The gas chamber G is formed on an upper side of the working fluid chamber L illustrated in FIG. 1, and a gas is charged into the gas chamber G. The working fluid chamber L and the gas chamber G are partitioned by a free piston 6 that is held in slide-contact with the inner periphery of the cylinder 1 so as to be movable in the axial direction.

The working fluid chamber L, which is formed on a lower side of the free piston 6 illustrated in FIG. 1, is partitioned by the piston 4 into the two pressure chambers L1, L2. Of the two pressure chambers L1, L2, the extension-side pressure chamber L1 is formed on the piston rod 3 side (lower side of FIG. 1), and the compression-side pressure chamber L2 is formed on the piston 4 side (upper side of FIG. 1).

A bottom case 12 is welded and fixed to an upper portion of the outer periphery of the cylinder 1 illustrated in FIG. 1. The upper spring bearing S1, on which an upper end of the suspension spring S abuts, is fixed to an outer periphery of the bottom case 12.

The head member 2, which is fixed to the lower end portion of the cylinder 1 illustrated in FIG. 1, is formed into an annular shape, and includes an axial center portion into which the piston rod 3 is inserted. The head member 2 further includes a rod guide 20 having an inner periphery onto which an annular bearing member 20a for axially supporting the piston rod 3 is fitted.

The head member 2 further includes a dust seal 21 laminated on a lower side of the rod guide 20 illustrated in FIG. 1 and having an inner periphery held in slide-contact with the outer periphery of the piston rod 3, an oil seal 22 laminated on an upper side of the rod guide 20 illustrated in FIG. 1 and having an inner periphery held in slide-contact with the outer periphery of the piston rod 3, and a rebound cushion 23 retained at an upper end portion of the rod guide 20 illustrated in FIG. 1 and absorbing a shock caused when the damper body extends completely.

In the piston rod 3 axially supported by the bearing member 20a in the head member 2 so as to protrude from and retract into the cylinder 1, a through-hole 30 and a side hole 31 are formed. The through-hole 30 passes through the piston rod 3 in the axial direction, and the side hole 31 communicates between the through-hole 30 and the jack chamber R.

A portion of the through-hole 30 directly above the side hole 31 illustrated in FIG. 1 is closed by a plug 32 that is fitted onto the inner periphery of the piston rod 3. The plug 32 prevents communication between the jack chamber R and the compression-side pressure chamber L2.

The piston rod 3 includes a coupling portion 33 formed at the lower end portion of the piston rod 3 illustrated in FIG. 1 and having an outer periphery in which a threaded groove is formed so as to be threadingly engaged with the wheel-side bracket 7, a piston rod body 34 formed on an upper side of the coupling portion 33 illustrated in FIG. 1, a piston retaining portion 35 formed on an upper side of the piston rod body 34 illustrated in FIG. 1 and having an outer periphery that is small in diameter, and a tip 36 formed on an upper side of the piston retaining portion 35 illustrated in FIG. 1 and having an outer periphery with which a nut N is threadingly engaged.

A stepped portion 37 is formed between the piston rod body 34 and the piston retaining portion 35 of the piston rod 3, and the side hole 31 is arranged at the upper end portion of the piston rod body 34 illustrated in FIG. 1.

On the outer periphery of the piston retaining portion 35, the piston 4 is sandwiched between the stepped portion 37 and the nut N. The piston 4 includes an extension-side fluid passage 40 and a compression-side fluid passage (not shown) which pass through the piston 4 in the axial direction and communicate between both the pressure chambers L1, L2.

An outlet-side opening of the extension-side fluid passage 40 is openably closed by an extension-side damping valve V1 laminated on an upper side of the piston 4 illustrated in FIG. 1. An outlet-side opening of the compression-side fluid passage (not shown) is openably closed by a compression-side damping valve V2 laminated on a lower side of the piston 4 illustrated in FIG. 1.

When the piston rod 3 extends to protrude from the cylinder 1, the piston 4 pressurizes the extension-side pressure chamber L1, and thus the working fluid contained in the extension-side pressure chamber L1 pushes and opens the extension-side damping valve V1. Then, the working fluid passes through the extension-side fluid passage 40 to move into the compression-side pressure chamber L2. Accordingly, the damper D with a vehicle height adjusting function generates a predetermined extension-side damping force.

At this time, the inside of the cylinder 1 has an insufficient volume by an amount corresponding to protruding of the piston rod 3, and hence the free piston 6 moves to the lower side of FIG. 1 by a length corresponding to the insufficient volume, with the result that the gas chamber G is enlarged.

On the other hand, when the piston rod 3 contracts to retract into the cylinder 1, the piston 4 pressurizes the compression-side pressure chamber L2, and thus the working fluid contained in the compression-side pressure chamber L2 pushes and opens the compression-side damping valve V2. Then, the working fluid passes through the compression-side fluid passage to move into the extension-side pressure chamber L1. Accordingly, the damper D with a vehicle height adjusting function generates a predetermined compression-side damping force.

At this time, the inside of the cylinder 1 has a surplus volume by an amount corresponding to retracting of the piston rod 3, and hence the free piston 6 moves to the upper side of FIG. 1 by a length corresponding to the surplus volume, with the result that the gas chamber G is reduced.

By the way, the vehicle height adjusting mechanism, which adjusts the axial length of the damper body, specifically, a distance between an upper end of the vehicle-body-side bracket 10 illustrated in FIG. 1 and a lower end of the wheel-side bracket 7 illustrated in FIG. 1, includes the partition wall member 5 defining the jack chamber R in the extension-side pressure chamber L1 and being capable of extending and contracting in the axial direction, and the pump P for supplying/discharging the working fluid into/from the jack chamber R.

The partition wall member 5 is arranged on the outer periphery of the piston rod 3 and includes a stationary partition wall 50 and a movable partition wall 51. The stationary partition wall 50 is laminated on the lower side of the compression-side damping valve V2 illustrated in FIG. 1 and sandwiched between the stepped portion 37 of the piston rod 3 and the nut N as well as the piston 4, the extension-side damping valve V1, and the compression-side damping valve V2. The movable partition wall 51 is slidably mounted on the head member 2 side of the stationary partition wall 50.

Figure 2:
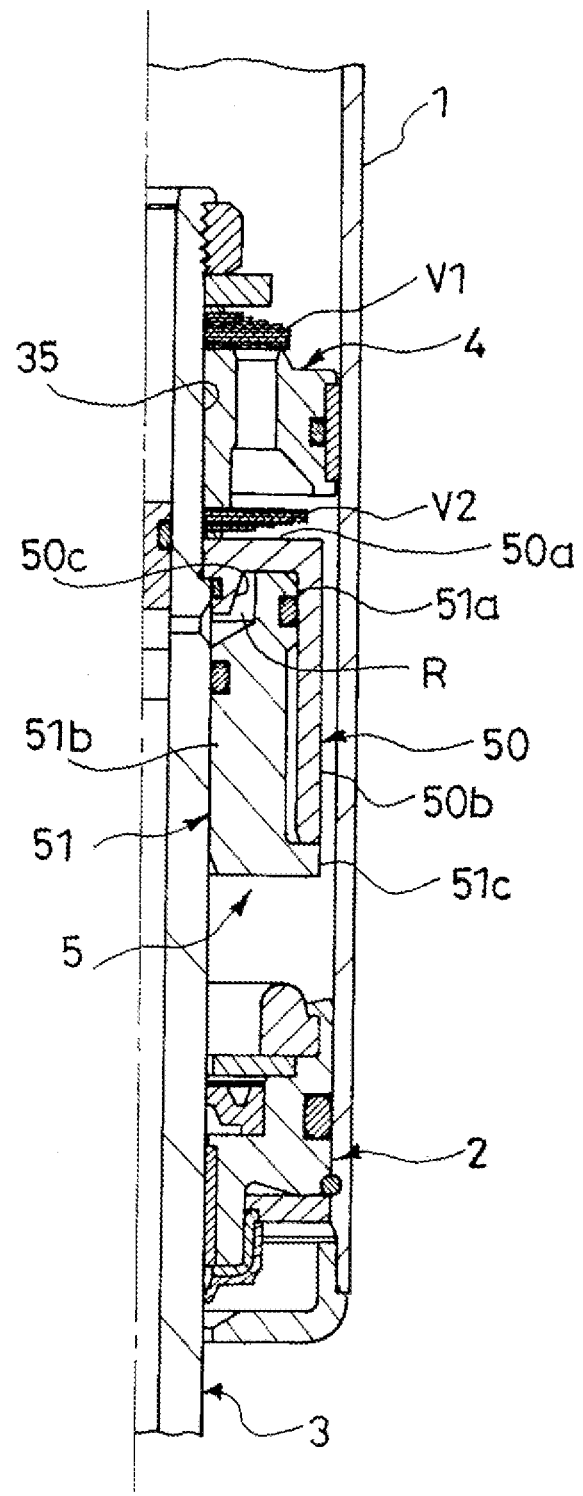
FIG. 2 is a partially enlarged longitudinal cross-sectional view illustrating a main part of the damper with a vehicle height adjusting function illustrated in FIG. 1.

As illustrated in FIG. 2, the stationary partition wall 50 includes a bottom 50a having an annular-plate-like shape and an inner periphery fixed to the outer periphery of the piston retaining portion 35 of the piston rod 3 and serving as a valve stopper for the compression-side damping valve V2, and a tubular wall portion 50b extending from an outer periphery of the bottom 50a toward the head member 2.

An annular projection 50c extending along the outer periphery of the piston rod 3 is provided on a lower surface of the bottom 50a illustrated in FIG. 2. A portion between an inner periphery of the projection 50c and the outer periphery of the piston rod 3 is sealed by a seal (not denoted by reference symbol) that is engaged in an annular groove (not denoted by reference symbol) formed in the inner periphery of the projection 50c.

The movable partition wall 51 is formed into a tubular shape, and includes a piston-side distal end portion 51a, a center portion 51b, and a head-member-side proximal end portion 51c. The piston-side distal end portion 51a has an inner periphery increased in diameter and forming the jack chamber R together with the stationary partition wall 50, and has an outer periphery held in slide-contact with the tubular wall portion 50b. The center portion 51b is continuously provided on the head member 2 side of the piston-side distal end portion 51a and has an inner periphery held in slide-contact with the outer periphery of the piston rod 3. The head-member-side proximal end portion 51c is continuously provided on the head member 2 side of the center portion 51b and has an outer periphery increased in diameter and opposed to an end portion of the tubular wall portion 50b on the head member 2 side.

Annular grooves (not denoted by reference symbol) are formed in the outer periphery of the piston-side distal end portion 51a and the inner periphery of the center portion 51b, respectively. The movable partition wall 51 is held in slide-contact with the inner periphery of the tubular wall portion 50b and the outer periphery of the piston rod 3 through the intermediation of seals (not denoted by reference symbol) which are engaged in the annular grooves, respectively.

The jack chamber R, which is formed between the stationary partition wall 50 and the movable partition wall 51, has a minimum volume when the piston-side distal end portion 51a of the movable partition wall 51 comes into contact with the bottom 50a of the stationary partition wall 50, or when an end portion of the tubular wall portion 50b of the stationary partition wall 50 on the head member 2 side comes into contact with the head-member-side proximal end portion 51c of the movable partition wall 51.

When the working fluid is supplied into the jack chamber R, the movable partition wall 51 moves to the lower side of FIG. 1 or 2, and thus the partition wall member 5 extends, with the result that the volume of the jack chamber R is increased. On the other hand, when the working fluid is discharged from the jack chamber R, the movable partition wall 51 moves to the upper side of FIG. 1 or 2, and thus the partition wall member 5 contracts, with the result that the volume of the jack chamber R is reduced.

As illustrated in FIG. 1, a jack passage for supplying/discharging the working fluid into/from the jack chamber R includes the through-hole 30 and the side hole 31 formed in the piston rod 3, a bracket internal passage formed in the wheel-side bracket 7 and communicated to the through-hole 30, and a hose H for communicating between the bracket internal passage 70 and the pump P arranged outside the damper body.

Only a portion of the through-hole 30 of the piston rod 3, which is formed on the lower side of FIG. 1 with respect to the plug 32, forms a part of the jack passage, and the bottom 50a of the stationary partition wall 50 is situated directly above the side hole 31 as illustrated in FIG. 1. Accordingly, the jack passage is always communicated to the jack chamber R.

The pump P is a pump driven by a motor M. For example, a pump described in JP 2010-149551 A can be used as the pump P.

In the damper D with a vehicle height adjusting function according to this embodiment, the working fluid is supplied/discharged into/from the jack chamber R, and thus the movable partition wall 51 is moved away from or close to the bottom 50a of the stationary partition wall 50. In this manner, the partition wall member 5 extends and contracts in the axial direction.

Figure 3:
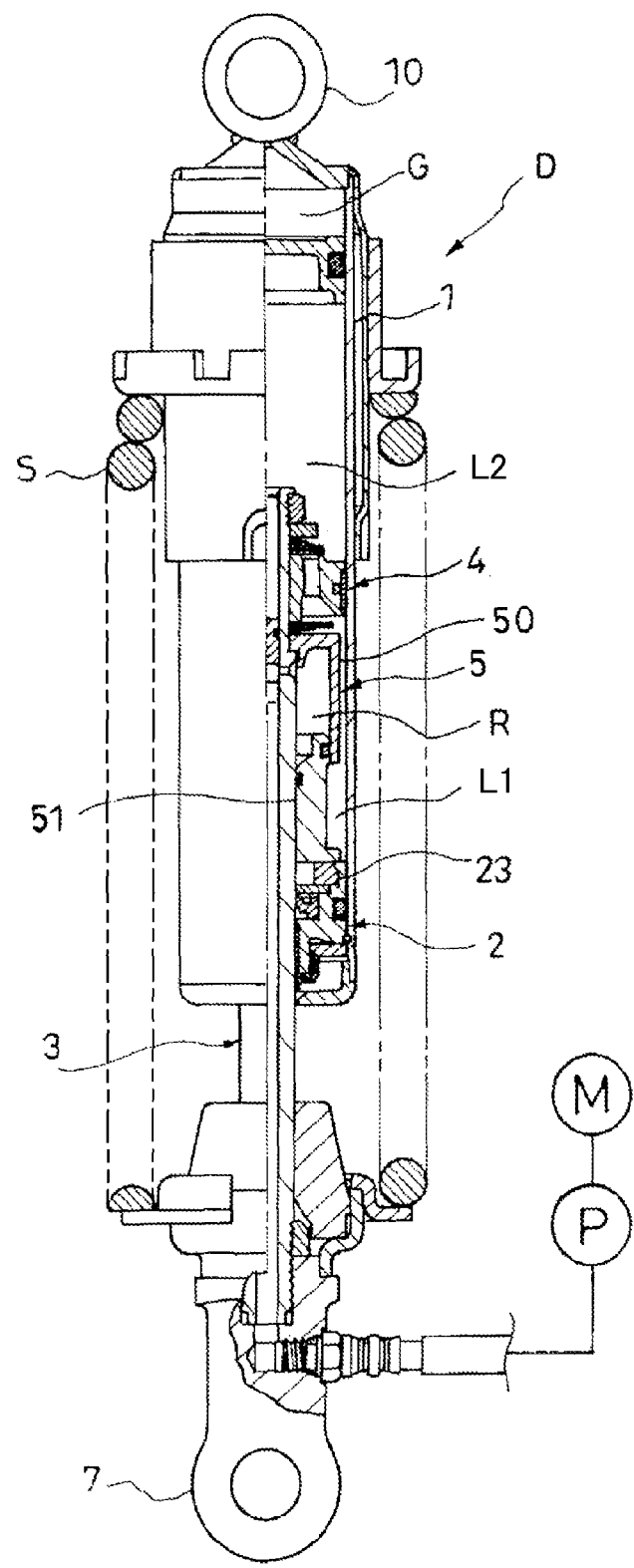
FIG. 3 is a side view illustrating a state in which a partition wall member is extended and an axial length of a damper body is reduced in the damper with a vehicle height adjusting function illustrated in FIG. 1.

Specifically, when the pump P supplies the working fluid into the jack chamber R, the movable partition wall 51 moves toward the head member 2, and the partition wall member 5 extends in the axial direction, with the result that the movable partition wall 51 comes into contact with the rebound cushion 23 of the head member 2. When the working fluid is further supplied into the jack chamber R, the head member 2 and the piston 4 are moved away from each other as illustrated in FIG. 3.

Thus, the piston rod 3 retracts into the cylinder 1, and hence the damper body contracts so as to reduce the axial length of the damper body. As a result, a height of the motorcycle is reduced.

Further, in a case of adjusting the vehicle height, it is only necessary to drive the pump P, and hence it is possible to adjust the vehicle height both during running and at the time of stop of the vehicle. For example, the vehicle height is lowered directly before the motorcycle stops, and thus it is possible to enhance easiness for a rider to put his/her feet on the ground.

Still further, the jack chamber R is defined in the extension-side pressure chamber L1. Accordingly, even if the working fluid contained in the jack chamber R leaks into the extension-side pressure chamber L1, the extension-side pressure chamber L1 is closed by the head member 2, and hence the working fluid contained in the jack chamber R does not leak out of the damper body.

Still further, the partition wall member 5 includes: the stationary partition wall 50 fixed to the piston rod 3 and arranged on the piston 4 side; and the movable partition wall 51 slidably mounted to the stationary partition wall 50 and arranged on the head member 2 side, and the jack chamber R is formed between the stationary partition wall 50 and the movable partition wall 51.

Therefore, the stationary partition wall 50 can be used as the valve stopper for the compression-side damping valve V2, and can be retained on the piston rod 3 together with the piston 4. Accordingly, it is possible to simplify a configuration of the damper D with a vehicle height adjusting function.

Further, the stationary partition wall 50 includes the bottom 50a, and the tubular wall portion 50b extending from the outer periphery of the bottom 50a toward the head member 2. The movable partition wall 51 has the outer periphery held in slide-contact with the inner periphery of the tubular wall portion 50b, and has the inner periphery held in slide-contact with the outer periphery of the piston rod 3. Accordingly, the partition wall member 5 has a simple configuration, and hence the jack chamber R can be easily formed in the extension-side pressure chamber L1.

Still further, the pump P is disposed outside the damper body, and supplies/discharges the working fluid into/from the jack chamber R via the jack passage. A part of the jack passage is formed in the piston rod 3. Accordingly, the damper body can be formed into a compact body, and hence it is possible to simplify the structure of the damper D with a vehicle height adjusting function.

Still further, the piston rod 3 is formed into a tubular shape, and includes the through-hole 30 passing through the piston rod 3 in the axial direction. One opening of the through-hole 30 on the compression-side pressure chamber L2 side is closed by the plug 32, and another opening of the through-hole 30 is used as a part of the jack passage. Therefore, the piston rod 3 is easily processed.

The embodiments of the present invention described above are merely illustration of some application examples of the present invention and not of the nature to limit the technical scope of the present invention to the specific constructions of the above embodiments.

For example, the above-mentioned embodiment exemplifies the case where the damper D with a vehicle height adjusting function is applied to the suspension device for suspending the rear wheel of the motorcycle. However, the same effects can be obtained even if the damper D with a vehicle height adjusting function is applied to a suspension device of a four-wheeled vehicle, etc.

Further, the above-mentioned embodiment exemplifies the inverted-type damper D with a vehicle height adjusting function, but an upright-type damper may be used.

Still further, according to the above-mentioned embodiment, the damper body is exemplified as a single-cylinder-type damper, but the following multi-cylinder-type damper may be used. Specifically, in the multi-cylinder-type damper, an outer tube is arranged on the outer side of the cylinder 1 coaxially with the cylinder 1, and a reservoir chamber for compensating a volume is arranged between the cylinder 1 and the outer tube.

Still further, the partition wall member 5 may have another structure as long as the partition wall member 5 can define the jack chamber R in one of the pressure chambers, and can extend and contract through supply/discharge of the working fluid into/from the jack chamber R. For example, the partition wall member 5 may be formed into a bellows shape.

Still further, according to the above-mentioned embodiment, the pump P for supplying/discharging the working fluid into/from the jack chamber R is driven by the motor M, but the pump P may be driven manually.

Still further, the working fluid contained in the jack chamber R may be the same as or different from the working fluid contained in the working fluid chamber L.

The present application claims a priority based on Japanese Patent Application No. 2011-172495 filed with the Japan Patent Office on Aug. 8, 2011, all the contents of which are hereby incorporated by reference.

The invention claimed is:

1. A damper with a vehicle height adjusting function being capable of adjusting a vehicle height, the damper comprising:
   a damper body including
      a cylinder,
      a head member having an annular shape and closing one end of the cylinder,
      a piston rod axially supported on an inner periphery of the head member and inserted in the cylinder so as to be movable in an axial direction, and
      a piston retained by the piston rod and partitioning an inside of the cylinder into two pressure chambers; and
   a vehicle height adjusting mechanism adapted to adjust an axial length of the damper body, wherein:
   the vehicle height adjusting mechanism includes
      a partition wall member defining a jack chamber in one of the pressure chambers and being capable of extending and contracting in the axial direction, the partition wall member including
         a stationary partition wall fixed to the piston rod and arranged on a piston side, and
         a movable partition wall slidably mounted to the stationary partition wall and arranged on a head member side, the jack chamber being formed between the stationary partition wall and the movable partition wall, and
      a pump supplying/discharging a working fluid into/from the jack chamber.

2. The damper with a vehicle height adjusting function according to claim 1, wherein
   the stationary partition wall includes a bottom having an annular-plate shape and fixed to an outer periphery of the piston rod, and a tubular wall portion extending from an outer periphery of said bottom toward the head member, and
   the movable partition wall has an outer periphery held in slide-contact with an inner periphery of the tubular wall portion, and has an inner periphery held in slide-contact with the outer periphery of the piston rod.

3. The damper with a vehicle height adjusting function according to claim 2, wherein
   the movable partition wall is formed into a tubular shape, and includes:
   a piston-side distal end portion having an inner periphery increased in diameter and forming the jack chamber together with the stationary partition wall, and having an outer periphery held in slide-contact with the tubular wall portion;

a center portion continuously provided on the head member side of the piston-side distal end portion and having an inner periphery held in slide-contact with the outer periphery of the piston rod; and a head-member-side proximal end portion continuously provided on the head member side of the center portion and having an outer periphery which is increased in diameter and is opposed to an end portion of the tubular wall portion on the head member side.

4. The damper with a vehicle height adjusting function according to claim 1, wherein the pump is disposed outside the damper body and supplies/discharges the working fluid into/from the jack chamber via a jack passage, and a part of the jack passage is formed in the piston rod.

5. The damper with a vehicle height adjusting function according to claim 2, wherein the movable partition wall is formed into a tubular shape, and includes:

a piston-side distal end portion having an inner periphery that varies in diameter and forms the jack chamber together with the stationary partition wall, and an outer periphery in slide-contact with the tubular wall portion;

a center portion provided on a head member side of the piston-side distal end portion and having an inner periphery held in slide-contact with the outer periphery of the piston rod; and a head-member-side proximal end portion continuously provided on a head member side of the center portion and having an outer periphery which has an outer diameter greater than that of the center portion, the head-member-side proximal end portion being opposed to an end portion of the tubular wall portion.

6. The damper with a vehicle height adjusting function according to claim 1, further comprising a compression-side damping valve that opens and closes a compression-side fluid passage connecting the two pressure chambers, wherein the stationary partition wall is a valve stopper for the compression-side damping valve.

7. The damper with a vehicle height adjusting function according to claim 1, wherein the stationary partition wall is disposed within the cylinder.

* * * * *